United States Patent
Gagnon (10) Patent No.: US 7,173,389 B1
(45) Date of Patent: Feb. 6, 2007

(54) MOTORIZED BARRIER OPERATOR ADAPTED TO VARY OPERATOR FORCE FOR SAFETY PURPOSES AND METHODS FOR ACCOMPLISHING THE SAME

(75) Inventor: Richard E Gagnon, Pensacola, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 0 days.

(21) Appl. No.: 10/875,408

(22) Filed: Jun. 24, 2004

(51) Int. Cl.
*G05B 5/00* (2006.01)
*G05D 3/00* (2006.01)
*H02H 7/08* (2006.01)
*H02P 1/04* (2006.01)
*H02P 3/00* (2006.01)

(52) U.S. Cl. .................. 318/469; 318/280; 318/281; 318/282; 318/283; 318/432; 318/434; 318/445; 318/466; 49/26; 49/28

(58) Field of Classification Search ........ 318/280–283, 318/432, 434, 443, 445, 466, 469; 49/26, 49/28
See application file for complete search history.

(56) References Cited

U.S. PATENT DOCUMENTS

| 5,278,480 | A | | 1/1994 | Murray ...................... 318/626 |
| 5,801,501 | A | * | 9/1998 | Redelberger ............... 318/283 |
| 5,977,732 | A | * | 11/1999 | Matsumoto ................. 318/283 |
| 5,998,950 | A | | 12/1999 | Fitzgibbon et al. ......... 318/280 |
| 6,034,497 | A | * | 3/2000 | Tamagawa et al. ......... 318/466 |
| 6,078,249 | A | | 6/2000 | Slavik et al. ............... 338/180 |
| 6,092,338 | A | * | 7/2000 | Crowner et al. ............. 49/360 |
| 6,326,751 | B1 | | 12/2001 | Mullet et al. ............... 318/434 |
| 6,696,806 | B2 | * | 2/2004 | Study et al. ................ 318/280 |
| 6,741,052 | B2 | * | 5/2004 | Fitzgibbon .................. 318/434 |
| 6,870,334 | B2 | * | 3/2005 | Jurado et al. ............... 318/282 |

* cited by examiner

*Primary Examiner*—Lincoln Donovan
*Assistant Examiner*—Erick Glass
(74) *Attorney, Agent, or Firm*—Renner Kenner Greive Bobak Taylor & Weber (57) ABSTRACT

A motorized barrier operator system that moves a barrier between limit positions includes a barrier, a motor coupled to the barrier and adapted to move the barrier between a full open limit position, a danger zone position, and a full close position. The system further includes a position sensor coupled to one of the barrier and the motor to detect the positions, and a force sensor coupled to one of the barrier and the motor to detect an actual force value during movement of the barrier. A controller is connected to the sensors which determines a first threshold response value between the full open limit position and the danger zone position, and a second threshold response value between the danger zone position and the full close limit position. The second threshold response value is less than the first threshold response value, and the controller commands the motor to at least stop movement of the barrier if the actual force value is greater than either of the threshold response values.

11 Claims, 5 Drawing Sheets

MOTORIZED BARRIER OPERATOR ADAPTED TO VARY OPERATOR FORCE FOR SAFETY PURPOSES AND METHODS FOR ACCOMPLISHING THE SAME

TECHNICAL FIELD

Generally, the present invention relates to a movable barrier having an operator mechanism which employs a control algorithm. More particularly, the present invention relates to a movable barrier operator mechanism employing a control algorithm which is configured to vary the operator force used to close the moveable barrier. More specifically, the present invention relates to an operator mechanism that utilizes a controller that varies the operator force used by the operator mechanism during movement of the moveable barrier through its final portion of travel.

BACKGROUND ART

Moveable barriers such as sectional doors have been used for years in association with utility buildings and residential garages. For convenience purposes, it is well known to provide such sectional doors with operator mechanisms including motors to facilitate opening and closing of the door. Moreover, a controller is provided to control operation of the operator mechanisms.

Normally, a controller is equipped with a safety subroutine used during the closing cycle of the sectional door. The safety subroutine responds when an obstruction is sensed in the path of the sectional door. For example, a force sensor is provided to sense forces resisting the movement of the sectional door. The force sensor provides sensor readings to the controller, and the sensor readings are compared to a response threshold.

The response threshold is set slightly above the force normally used by the operator mechanism to close the sectional door. If the sensor readings have values below the response threshold, then the controller instructs the operator mechanism to continue operation. However, if the sensor readings have values above the response threshold, then the controller deactivates operation of the operator mechanism.

Because there can be significant differences between normal resistance forces along the length of the sectional door's travel from the opened position to the closed position, and the response threshold of the safety subroutine, the sensitivity of the safety subroutine varies.

For example, when the normal resistance to movement of the sectional door is high, the difference between the readings of the force sensor and the response threshold is small. Therefore, when the normal resistance to movement of the sectional door is high, the safety subroutine is very sensitive because only a small force due to an obstruction is required to push the sensor readings past the response threshold. However, when the normal resistance to movement of the sectional door is low, the difference between the readings of the force sensor and the response threshold is large. Therefore, when the normal resistance to movement of the sectional door is low, the safety subroutine is not very sensitive because a large obstruction force is required to push the sensor reading past the response threshold.

During most of the length of travel of the sectional door from the opened position to the closed position, the sensitivity of the safety subroutine is immaterial because movement of the sectional door will push an obstruction out of its path. However, during the final portion of travel (from approximately twelve (12) inches above the ground to the ground), which is appropriately named the "danger zone," it is possible for children and small animals to be trapped underneath the sectional door. However, because the normal resistance to movement of the sectional door during travel through the danger zone is low, the sensitivity of the safety subroutine during such travel is also low. Therefore, a large obstruction force would be necessary to push the sensor reading past the response threshold during travel of the sectional door through the danger zone.

The large obstruction force necessary to "trip" the safety routine translates into a longer period of time children or small animals may be trapped beneath the sectional door before the safety routine is actuated. As such, the lack of sensitivity of the safety routine during the travel of the sectional door through the danger zone is potentially dangerous.

Therefore, there is a need for a controller capable of varying the operator force, and hence, varying the response threshold of the safety subroutine, during the final portion of travel of the sectional door.

DISCLOSURE OF THE INVENTION

In general, the present invention contemplates a motorized barrier operator adapted to vary operator force for safety purposes and methods for accomplishing the same.

The invention further contemplates a method for adjusting force sensitivities used by a barrier operator system during closure of a barrier moveable between limit positions comprising: monitoring a position and an actual travel force for the barrier as the barrier moves between the limit positions; designating a danger zone position between the limit positions; comparing a pre-set operator force threshold value to the actual travel force while moving the barrier from one of the limit positions toward the danger zone position; comparing a recorded operator force threshold value to the actual travel force value while moving the barrier from the danger zone position toward the other of the limit positions, wherein the recorded operator force threshold value is less than the pre-set operator force threshold value; and implementing corrective action if the actual travel force exceeds one of the threshold values.

Another aspect of the present invention is attained by a motorized barrier operator system that moves a barrier between limit positions, comprising: a barrier; a motor coupled to the barrier and adapted to move the barrier between a full open limit position, a danger zone position, and a full close position; a position sensor coupled to one of the barrier and the motor to detect the positions; a force sensor coupled to one of aid barrier and the motor to defect an actual force value during movement of the barrier; and a controller connected to the sensors which determines a first threshold response value between the full open limit position and the danger zone position, and a second threshold response value between the danger zone position and the full close limit position, wherein the second threshold response value is less than the first threshold response value, and wherein the controller commands the motor to at least stop movement of the barrier if the actual force value is greater than either of the threshold response values.

BEST MODE FOR CARRYING OUT THE INVENTION

Figure 1:
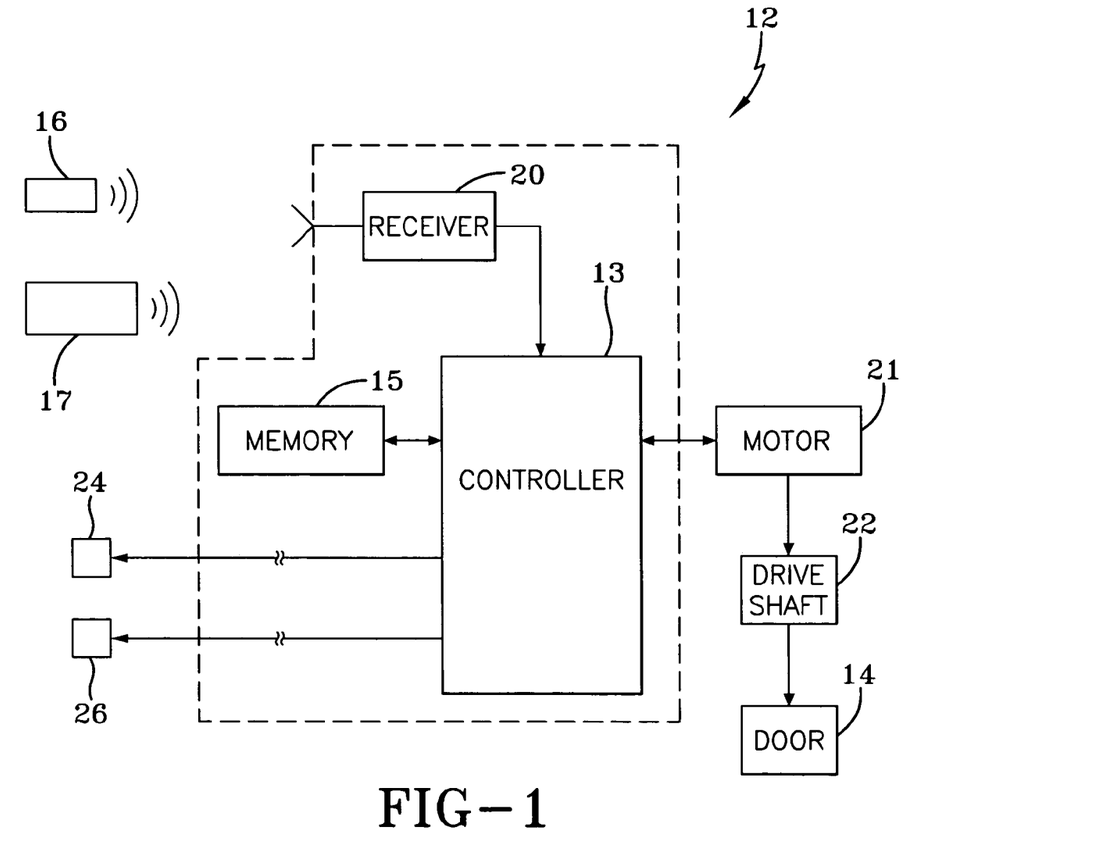
FIG. 1 is a schematic diagram of an operator mechanism used for facilitating movement of a sectional door.

With initial reference to FIG. 1, the operator mechanism used for controlling the movement of a sectional door is generally indicated by the numeral 12. The operator mechanism 12 employs a controller 13 for initiating operation of the operator mechanism 12 to move a sectional door 14 between limit positions generally recognized as the opened and closed positions of the sectional door 14. The sectional door 14 is representative of any moveable barrier such as an awning, gate, window, or the like. The controller 13 is a microprocessor which includes the necessary hardware and software to implement operation of the operator mechanism 12. Furthermore, a memory device 15 is connected to the controller 13 for storing information regarding movement of the sectional door 14. It will be appreciated that the controller 13 may include an internal memory device.

A remote actuator 16 or a wall station 17 can be actuated to generate a radio frequency signal received by the controller 13 to control the operation of the operator mechanism 12. For example, a receiver 20 attached to the controller 13 is adapted to receive such a signal and convert it into a form usable by the controller 13. Of course, operational signals may be directly received by the controller 13 via a direct wired connection or they may be other types of wireless signals. If a valid signal is received by the controller 13, it initiates the operator mechanism 12 which includes a motor 21 and a drive shaft 22 rotated by the motor 21. Rotation of the drive shaft 22 by the motor 21 drives the sectional door 14 between the opened and closed positions. As such, the operator mechanism 12 together with the controller 13 serve to move the sectional door 14 back and forth between open and closed positions. Furthermore, as seen in FIG. 1, the controller 13 is also connected to a position sensor 24 and a force sensor 26. The sensors 24 and 26 are coupled to or associated with some or all of the components which generate measurable output such as the door 14, the motor 21, and the drive shaft 22 during the opening and closing cycles.

Figure 2:
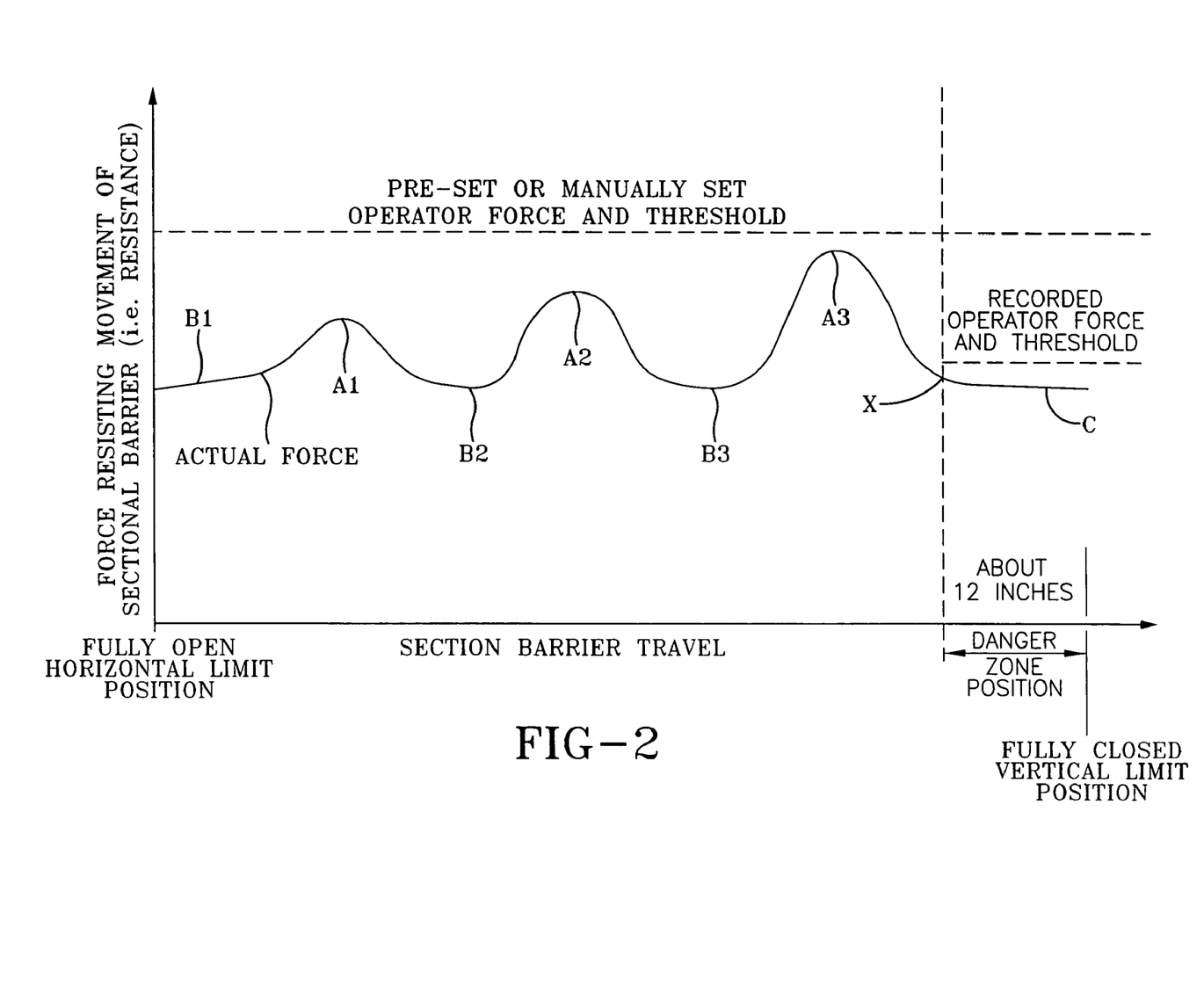
FIG. 2 is graphical depiction of the normal resistance forces experienced by the sectional door along its length of travel between opened and closed positions.

As seen in FIG. 2, the force necessary to close a sectional door varies along its length of travel. The graphical representation of FIG. 2 corresponds to a sectional door composed of three (3) panels moving from the fully opened position to the fully closed position. As such, the force resisting movement of the sectional door 14, and thereby the actual force required to close the sectional door 14 varies between maximum values (where resistance to movement of the sectional door is high) indicated by A1, A2, and A3, and minimum values (where resistance to movement of the sectional door is low) indicated by B1, B2, B3, and C. The force resisting movement represented by the points A–C in any given closing cycle is referred to in the control algorithm to be discussed as the "actual force value." As will become apparent, these values are monitored to ensure they stay within the defined safety criteria.

The maximum values A1, A2, and A3 occur when the panel-to-panel interfaces initially change orientation, and pass from a substantially horizontal position to a substantially vertical position. The minimum values B1, B2, and B3 occur between the instances when the panel-to-panel interfaces are initially changing orientation. Furthermore, the minimum value C occurs during the final portion of the sectional door's travel.

Previously, the operator force used to close a sectional door has been pre-set or manually set to a constant amount from the fully open to the fully close positions (as seen in FIG. 2) which corresponds to the maximum force necessary to close the sectional door 14 (and hence, is somewhat greater than the actual force maximum values A1, A2, and A3). As such, the operator force is not usually varied by prior art controllers. In other words, the prior art controllers always attempt to apply the manually set operator force value to ensure closure of the door. As used herein, the set operator force value is what the controller commands the motor to apply to the door via the drive shaft. It will be appreciated that in normal unobstructed operation, the actual force value will be less than the set operator force. Therefore, an excess of force has previously been used to close the sectional door 14 over much of the sectional door's length of travel. However, unlike prior art controllers, the controller 13 is adapted to vary the sensitivity associated with the force applied by the operator mechanism 12 to close the sectional door 14 during its movement through the final portion of the sectional door's travel. The final portion of the sectional door's travel is designated as the "danger zone," and varying the sensitivity of the force applied by the operator mechanism 12 serves to increase the operational safety of the sectional door 14 during its travel through the danger zone. The danger zone portion preferably starts anywhere between 6 to 12 inches above the fully closed position.

In addition to varying the sensitivity of the force applied, the controller 13 includes a safety subroutine programmed to respond to obstructions in the path of the sectional door 14. As discussed below, the controller 13 is configured to receive sensor readings corresponding to the forces the sectional door 14 is subjected to, and is programmed to respond when the sensor readings indicate that the sectional door 14 is exposed to an obstruction. If the sectional door 14 is exposed to an obstruction, the safety subroutine is programmed to implement corrective action. Such correction action can include stopping and, thereafter, reversing movement of the sectional door 14.

To distinguish between the normal resistance forces—the actual force values—along the sectional door's length of travel and obstructions (which both generate sensor readings), a response threshold of the safety subroutine is set approximately to the setting of the pre-set or manually set operator force, which, as discussed above, is slightly greater than the actual maximum values A1, A2, and A3. As such, the safety subroutine responds when the sensor readings indicate that the sectional door 14 is exposed to actual force values that are greater than the response threshold.

However, varying the operator force threshold during travel through the danger zone allows the controller 13 to increase the sensitivity of the safety subroutine, and thereby decrease the obstruction force necessary to "trip" the safety subroutine during the final portion of the sectional door's travel. For example, during travel through the danger zone, the controller 13 is programmed to instruct the operator mechanism 12 to apply an operator force value somewhat greater than the minimum value C but substantially less than the set operator force. Accordingly, the controller 13 resets or adjusts the response threshold of the safety subroutine slightly higher than the set operator force value corresponding to the minimum value C. Therefore, because the difference between the normal resistance—actual force—to movement of the sectional door 14 in the danger zone and the response threshold as reset by the controller 13 is small, the safety subroutine is very sensitive because only a small force due to an obstruction is required to push the sensor reading past the response threshold. Thus it will be appreciated the controller provides at least two response thresholds. The first threshold corresponds to the pre-set or manually set operator force as the door travels from the fully open position to the start of the danger zone. And the second response threshold corresponds to a recorded operator force—the setting of which will be discussed—as the door travel through the danger zone to the fully closed position.

Figure 3A:
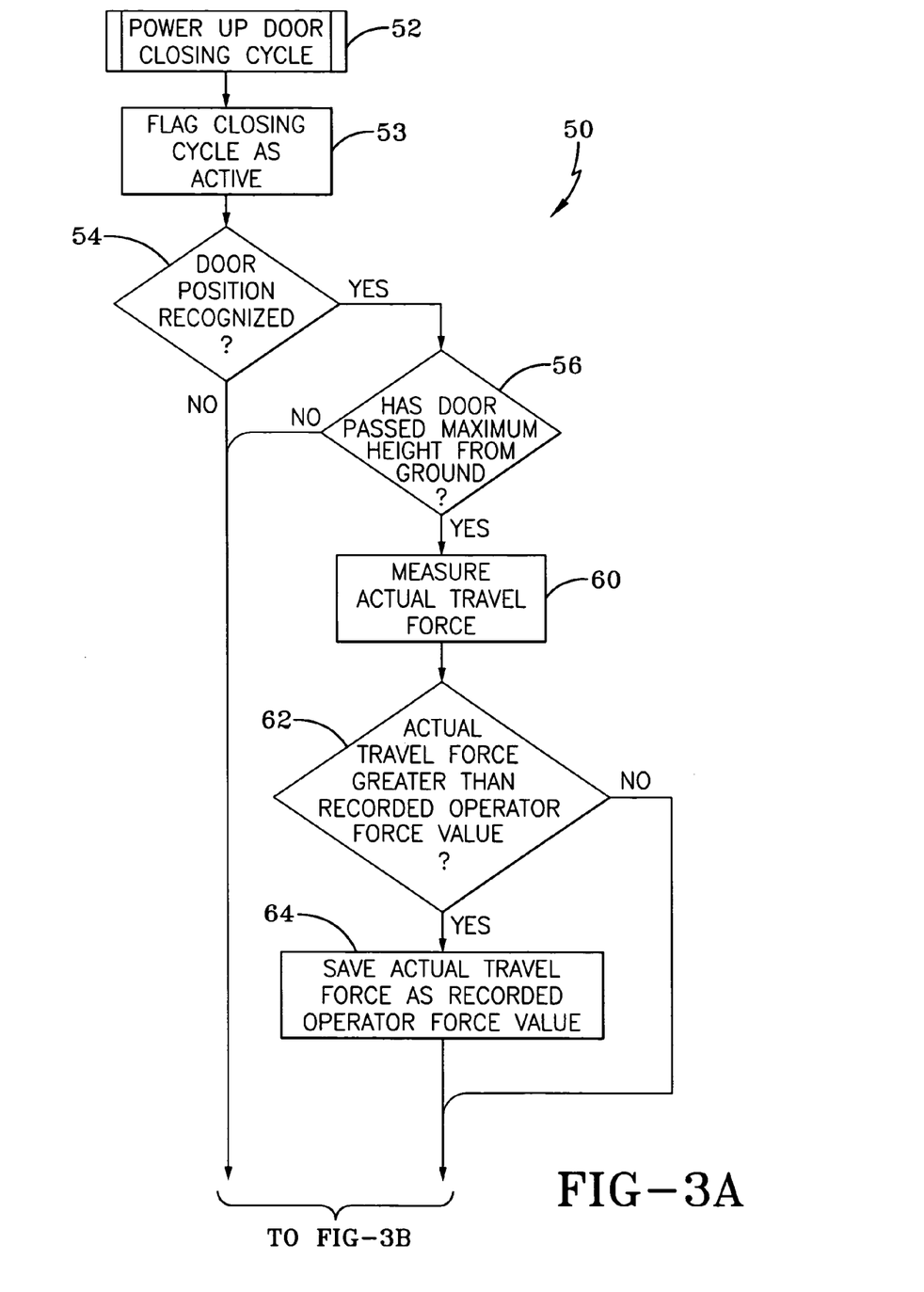
FIGS. 3A–3C show a flow chart depicting a control algorithm used by a controller for facilitating movement of the sectional door.
Figure 3B:
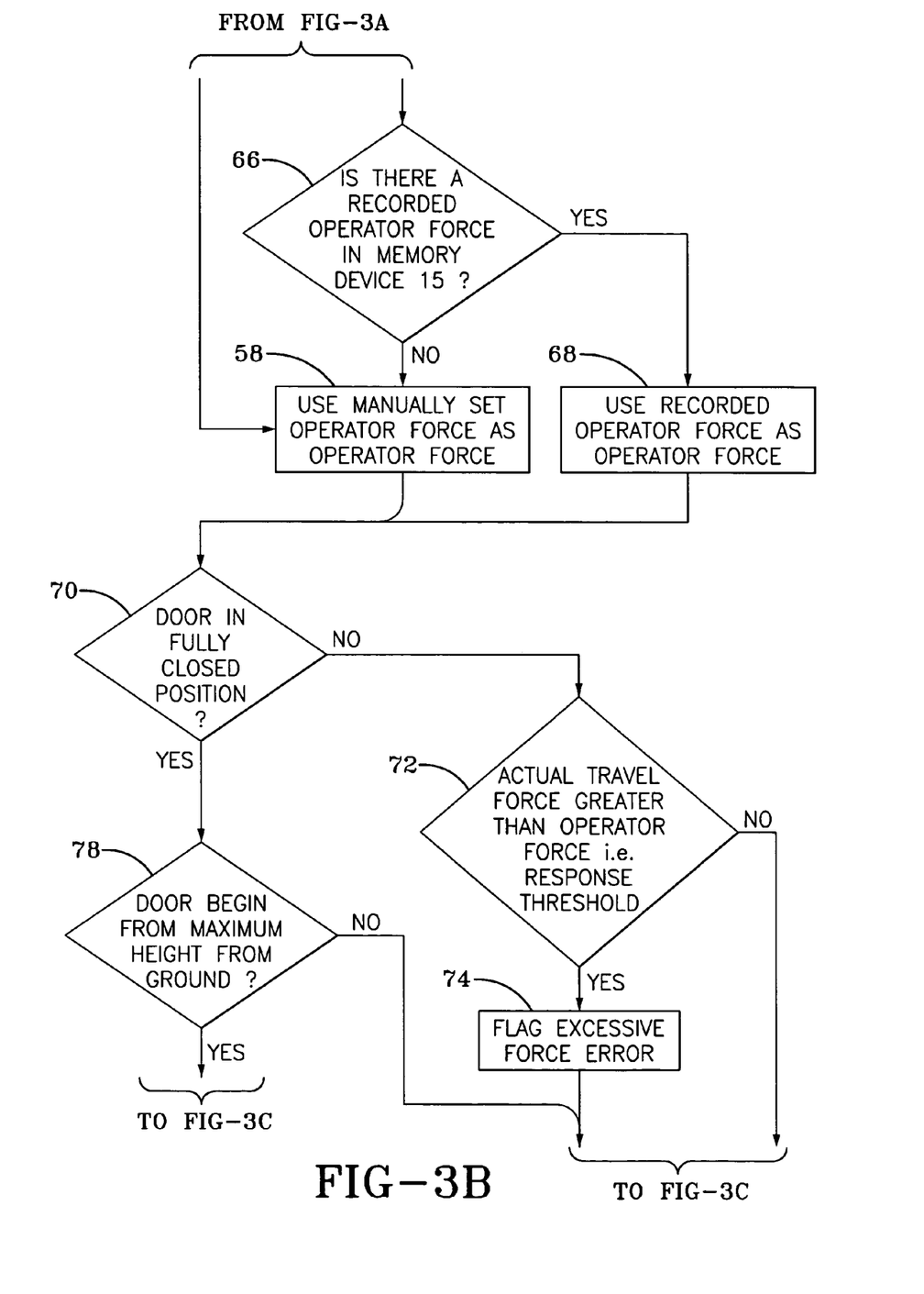
Figure 3C:
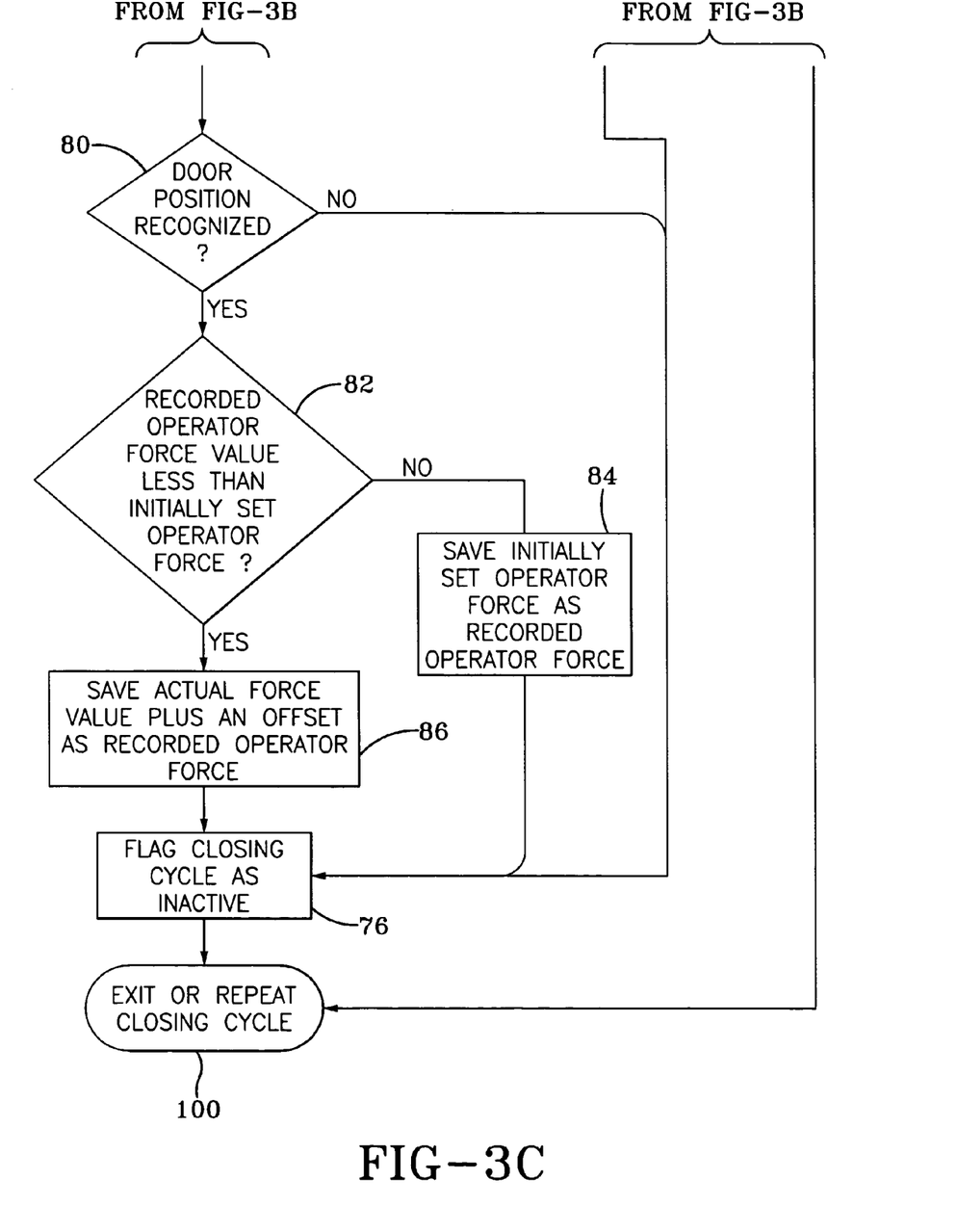

The controller 13 is programmed with a control algorithm generally indicated by the numeral 50 in FIG. 3. The control algorithm 50 incorporates the safety subroutine, and uses input from various sensors to monitor the operator force and increase operational safety of the sectional door 14 during travel through the danger zone. For example, the controller 13 receives sensor readings from various sensors which monitor the position of the sectional door 14 and the force exerted by the motor 21 at that position. The force resisting movement represented by the points A–C in any given closing cycle is referred to in the control algorithm to be discussed as the "actual force value." As will become apparent, these values are monitored to ensure they stay within defined safety criteria.

A position sensor 24, such as a potentiometer, a pulse counter or an encoder, can be used to determine the position of the sectional door 14 when moving back and forth between open and closed positions. For example, a potentiometer, such as that disclosed in U.S. Pat. No. 6,078,249, which is incorporated herein by reference, can be provided adjacent to the drive shaft 22. Such a potentiometer includes a housing which converts the rotational movement of the drive shaft 22 to linear movement which can be converted by the potentiometer into an electrical signal. Thereafter, the electrical signal can be relayed to the controller 13, which can process the electrical signal to determine the position of the sectional door 14. Furthermore, a pulse counter or encoder can be used in place of the potentiometer. The pulse counter and encoder count optical pulses or magnetic pulses, respectively. Thereafter, these pulses are converted into an electrical signal relating to the position of the bottom edge of the bottom panel relative to the ground, which can be relayed to the controller 13.

In addition to the position sensor 24, a force sensor 26 can be provided to determine the actual force exerted by the motor 21 on the sectional door 14. The force sensor 26 can be an additional potentiometer, pulse counter or encoder which provides a signal related to a travel distance per period of time to the controller 13 that can be converted by the controller 13 into a speed measurement. Since the controller 13 does not include automatic speed compensation, the speed of the sectional door 14 is related to the actual force exerted by the motor 21. Therefore, the heavier the load, the slower the speed of the sectional door 14 and the lighter the load, the faster the speed of the sectional door 14. Alternately, the force sensor 26 can be a current sensor used to measure the amount of current drawn by the motor 21. Either way, the force sensor 26 (like position sensor 24) is connected to the controller 13 so that electrical signals related to the actual force exerted by the motor 21 on the sectional door 14 can be utilized by the controller 13 during the door closing process.

The operation of the controller 13 according to control algorithm 50 is different depending on whether the sectional door 14 is experiencing its first closing cycle, such as in a learn mode, or whether the sectional door 14 is experiencing further closing cycles. The first closing cycle is used to record sensor readings for use by the control algorithm 50 to control further closing cycles. As such, the control algorithm 50 during the first closing cycle uses an initial operator force (either set at the factory or manually set by a user) as the applied operator force for its entire travel. Thereafter, during further closing cycles, the control algorithm 50 uses the sensor readings to adjust the response threshold of the operator force used in the danger zone, and increase the sensitivity of the safety subroutine.

As seen in FIGS. 3A–3C, the control algorithm 50 is depicted as a flow-chart detailing the steps followed during operation of the controller 13. Initially, during the closing cycles, power is supplied at step 52 by the controller 13 to the operator mechanism 12, whereupon at step 53, the closing cycle of the sectional door 14 is flagged as being active. Immediately upon initiation of the closing cycle at step 52, the controller 13 determines at step 54 whether the position of the sectional door 14 provided by sensor 24 is recognized.

Generally, the position of the sectional door 14 is measured by the position sensor 24 which determines the position of the bottom edge of the bottom panel of the sectional door 14 relative to the ground. However, during the closing cycle, the controller 13 is programmed to specifically recognize the position of the sectional door 14 in three (3) places: the opened position, the beginning of the danger zone, and the closed position. Whether the position of the sectional door 14 is recognized, and which of the recognized positions the sectional door 14 is located at determines the setting of the operator force used by the operator mechanism 12 to close the sectional door 14.

For example, if at step 54 the position of the sectional door 14 is not recognized, or if at step 54 the position of the sectional door 14 is recognized, and at step 56 the sectional door 14 is in the opened position, then at step 58 the pre-set operator force is used to close the sectional door 14. Alternately, if at step 54 the position of the sectional door 14 is recognized, but at step 56 the sectional door 14 is not in the opened position, then the sectional door 14 is traveling through the danger zone. When the sectional door 14 is traveling through the danger zone, the control algorithm 50 is configured to continue the closing cycle to step 60, and thereafter, is adapted to measure an actual travel force (designated as X in FIG. 2) for use in varying the later applied operator force and the associated response thresholds.

At step 60, the actual travel force is measured by the force sensor 26. Thereafter, at step 62 the actual travel force measured at step 60 is compared to a recorded operator force value stored in the memory device 15. As discussed below, the recorded operator force value plus an offset is later used in updating the operator force threshold during travel of the sectional door 14 through the danger zone. If at step 62 the recorded operator force value is greater than the actual travel force measured at step 60, then the recorded operator force value remains unchanged and the process continues to step 66. However, if at step 62 the recorded operator force value is less than the actual travel force measured at step 60, then the actual travel force measured at step 60 is substituted for the recorded comparison force value at step 64 and the process continues to step 66.

At step 66 the controller 13 determines whether a recorded operator force value is stored in the memory device 15. In the case of the first closing cycle, there would be no recorded operator force value stored in the memory device 15. Therefore, as specified by step 58, the pre-set operator force value will be used in the first closing cycle to close the sectional door 14 during its travel through the danger zone. However, in the case of further closing cycles, the recorded operator force would have been stored in the memory device 15. Therefore, as specified by step 68, the recorded operator force will be used as the sectional door 14 travels through the danger zone.

Whether the pre-set operator force is used (according to step 58) or the recorded operator force is used (according to step 68) in closing the sectional door 14, at step 70 the controller 13 determines whether the sectional door 14 reaches the fully closed position. If at step 70 the sectional door 14 has not reached the fully closed position, the closing cycle continues to step 72.

Step 72 embodies the above-discussed safety subroutine of the control algorithm 50. For example, at step 72 the actual travel force is compared to the setting for the operator force (either the pre-set operator force or the recorded operator force) which serves as the first response threshold. If the actual travel force is less than (or equal to) the response threshold, the closing cycle continues to step 100 which directs the control algorithm to be repeated. However, if the actual travel force is greater than the response threshold, then an excessive force error is flagged at step 74 because there is likely to be an obstruction blocking the sectional door 14. Once an excessive force error has been flagged at step 74, the closing cycle is flagged as inactive at step 76 and the door closing process is exited at step 100.

As discussed above, the response threshold setting is varied depending on the position of the sectional door 14. As such, the actual travel force required to flag an error at step 74 will also be different, depending on the position of the sectional door 14. For example, the use of a smaller recorded operator force threshold during travel through the danger zone allows a correspondingly smaller actual travel force measurement to trigger the deactivation of the sectional door 14 at step 76, because the smaller operator force is used as the response threshold at step 72. As such, the sensitivity of the safety subroutine at step 72 is increased, and consequently, the operational safety of the sectional door 14 is increased during movement through the danger zone.

If at step 70 the sectional door 14 has reached the fully closed position, the control algorithm 50 is configured to possibly reevaluate the recorded operator force, and as such, the threshold value. For example, at step 78 the controller 13 determines whether the sectional door 14 began closing from its maximum height. If the sectional door 14 did not begin closing from the fully opened position, then, because the sectional door 14 must begin its closing movement from its maximum height to provide relevant force measurements for changing the setting of the recorded operator force, the recorded operator force is not reevaluated, and the door closing cycle is flagged as inactive at step 76.

Alternately, if the sectional door 14 began closing from the fully opened position, then at step 80 the controller 13 determines whether the position of the sectional door 14 is recognized. If the position of the sectional door 14 is not recognized (i.e. not in the closed position), then the door closing cycle is flagged as inactive at step 76. However, if the position of the sectional door 14 is recognized (i.e. in the closed position or in the danger zone), then the closing cycle continues to step 82.

At step 82, the recorded operator force value introduced at step 62 is compared to the pre-set operator force. If the recorded operator force value is not less than (i.e. greater than) the pre-set operator force, the pre-set operator force is saved at step 84 by the memory device 15 as the recorded operator force value. As such, saving the pre-set operator force as the recorded operator force at step 84 insures that the operator force never exceeds the pre-set operator force.

Alternatively, if the detected operator force value is less than the pre-set or manually set operator force, then the detected operator force value plus an offset is saved at step 86 by the memory device 15 as the recorded operator force value, and as such the response threshold for the danger zone. Either way, after determining the recorded operator force value, the closing cycle is flagged as inactive at step 76.

In conclusion, the control algorithm 50 embedded within the controller 13 allows the threshold response levels used by the operator mechanism 12 to be varied during travel of the sectional door 14 through the danger zone. Simultaneously, the controller 13 using the control algorithm 50 incorporates a safety subroutine at step 72 which compares the actual travel force measured at step 60 to the operator force setting used at that position of the sectional door 14. Varying the operator force setting through the danger zone allows the response threshold to be adjusted to correspond to the operator force setting. As such, the sensitivity of the subroutine is maintained during travel of the sectional door 14 through the danger zone.

Thus, it should be evident that the controller 13 and controller algorithm 50 disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

The invention claimed is:

1. A method for adjusting force sensitivities used by a barrier operator system during closure of a sectional barrier moveable between horizontal and vertical limit positions comprising:
    monitoring a position and an actual travel force for the barrier as the barrier moves between the limit positions;
    designating a danger zone position between the limit positions;
    setting a danger zone from the danger zone position up to about 12 inches from one of the limit positions;
    comparing a pre-set operator force threshold value to said actual travel force while moving the barrier from one of the limit positions toward said danger zone position;
    comparing a recorded operator force threshold value to said actual travel force value while moving the barrier from said danger zone position toward the other of the limit positions, wherein said recorded operator force threshold value is less than said pre-set operator force threshold value;
    saving said actual travel force value plus an offset as said recorded operator force if said recorded operator force is less than said pre-set operator force;
    implementing corrective action if said actual travel force exceeds one of said threshold values; and
    adjusting said recorded operator force threshold value used in said danger zone to increase the force sensitivity thereof.

2. The method according to claim 1, further comprising:
    comparing a recorded operator force value to said actual travel force while moving the barrier from said danger zone position toward the other of the limit positions, wherein if said actual travel force is greater than said recorded operator force value, said actual travel force is saved as said recorded operator force value.

3. The method according to claim 1, further comprising:
    comparing said recorded operator force value to said pre-set operator force value, wherein if said recorded operator force value is less than said pre-set operator force value, said actual travel force value plus an offset is saved as said recorded operator force value.

4. The method according to claim 1, further comprising: comparing said recorded operator force value to said pre-set operator force value, wherein if said recorded operator force value is greater than said pre-set operator force value, said pre-set operator force is saved as said recorded operator force value.

5. The method according to claim 1, further comprising: saving said pre-set operator force as said recorded operator force if said recorded operator force is greater than said pre-set operator force.

6. A motorized barrier operator system that moves a barrier between horizontal and vertical limit positions, comprising:
   a sectional barrier;
   a motor set at an initial operator force value, said motor coupled to said sectional barrier and adapted to move said sectional barrier between a full open limit position, a danger zone position, and a full close position, wherein the danger zone position is up to about 12 inches away from said full close position so as to define a danger zone;
   a position sensor coupled to one of said sectional barrier and said motor to detect said positions;
   a force sensor coupled to one of said sectional barrier and said motor to detect an actual force value during movement of said sectional barrier; and
   a controller connected to said sensors which determines a first threshold response value between said full open limit position and said danger zone position, and a second threshold response value between said danger zone position and said full close limit position, wherein said second threshold response value is less than said first threshold response value, and wherein said controller commands said motor to at least stop movement of said sectional barrier if said actual force value is greater than either of said threshold response values, said controller adjusting said second threshold response value used in said danger zone to increase the sensitivity force thereof, wherein said controller compares said initial operator force value to a recorded operator force value only if said position sensor determines that said barrier was initially closed from a fully opened position.

7. The system according to claim 6, wherein said controller generates a recorded operator force value for said danger zone.

8. The system according to claim 6, wherein said controller compares said actual force value to said recorded operator force value and if said actual travel force is greater than said recorded operator force value said controller saves said actual force value as said recorded operator force value.

9. The system according to claim 6, wherein said controller saves said actual force value plus an offset as said recorded operator force value if said recorded operator force value is less than said initial operator force value.

10. The system according to claim 6, wherein said controller saves said initial operator force value as said recorded operator force value if said recorded operator force value is greater than said initial operator force value.

11. A method for adjusting force sensitivities used by a barrier operator system during closure of a sectional barrier moveable between horizontal and vertical limit positions comprising:
    monitoring a position and an actual travel force for the barrier as the barrier moves between the limit positions;
    designating a danger zone position between the limit positions;
    setting a danger zone from the danger zone position up to about 12 inches from one of the limit positions;
    comparing a pre-set operator force threshold value to said actual travel force while moving the barrier from one of the limit positions toward said danger zone position;
    comparing a recorded operator force threshold value to said actual travel force value while moving the barrier from said danger zone position toward the other of the limit positions, wherein said recorded operator force threshold value is less than said pre-set operator force threshold value;
    implementing corrective action if said actual travel force exceeds one of said threshold values;
    adjusting said recorded operator force threshold value used in said danger zone to increase the force sensitivity thereof;
    determining the position of said barrier when the closure of said barrier was initiated; and
    comparing said recorded operator force to said pre-set operator force, only if the closure of the barrier was initiated from a fully opened position.

* * * * *